July 8, 1969 E. J. RUOF 3,454,925
BRAKE TEMPERATURE INDICATING SYSTEM
Filed April 7, 1966 Sheet 1 of 2

INVENTOR.
EDGAR J. RUOF
BY
J. B. Holden
ATTORNEY

INVENTOR.
EDGAR J. RUOF

United States Patent Office 3,454,925
Patented July 8, 1969

3,454,925
BRAKE TEMPERATURE INDICATING SYSTEM
Edgar J. Ruof, Akron, Ohio, assignor to The Goodyear
 Tire & Rubber Company, Akron, Ohio, a corporation
 of Ohio
Filed Apr. 7, 1966, Ser. No. 541,015
Int. Cl. B60q *1/52;* G08b *21/00*
U.S. Cl. 340—57                                9 Claims

ABSTRACT OF THE DISCLOSURE

A brake temperature indicating system which utilizes a unique electrical circuit in association with conventional temperature indication sensors to actuate warnings when brake temperatures have reached a point, expecially in aircraft, where there is danger that in landing or taking off the brakes will not function safely or structural damage will be caused to the brakes by their use. A single sensor can activate the warnings. Reference voltages are utilized to establish the turnon level in accordance with signals from the temperature sensors.

---

This invention relates to a brake temperature indicating system, and more particularly to a novel electrical arrangement for indicating by use of warning lights, or meters, when the brake temperature in brakes, especially in aircraft, becomes either too high to safely take off or land, or becomes so high that there may be danger to structural damage in the brake.

Heretofore, it has been known that heat and temperature in aircraft brakes have been considerable problems in the art. Hence, it is desirable to have some type of pilot indication system when the brake temperatures are too high to safely take off or land, or when the brake temperatures become so high that structural damage may occur, or to provide an indication of actual failure within the sensing means. While it is recognized that attempts have been made to provide temperature indication systems for brakes, it is not believed that prior systems have been successful because of their non-reliability, great complexity, and relatively high cost.

Therefore, it is the general object of the present invention to avoid and overcome the foregoing and other difficulties of, and objections to prior art practices by the provisions of a brake temperature indication system which utilizes a unique electrical circuit in association with substantially conventional platinum temperature indication sensors to actuate warnings when brake temperatures have reached a point where the airplane should not take off, or danger warnings when extremely high temperatures have been reached in a brake.

A further object of the invention is to utilize novel electrical circuitry to achieve both a visual warning system, as well as a test or meter temperature indication of the specific temperature in each brake unit.

A further object of the invention is to provide a brake temperature indication system wherein a single sensor can control activation of an amber warning light and a red warning ilght indicating different temperatures in the brake, and where reference voltages are utilized to establish the light turn on level and are stabilized by the particular electric circuit, and further where a circuit dividing the electrical power to the sensor circuit is provided and is stabilized against changes in load, supply voltage, and temperature.

The foregoing and other objects of the invention, which will become apparent as the description proceeds, are achieved by providing in a brake temperature indication system the combination of a rotatable wheel, brake means for the wheel, a temperature sensor mounted in close proximity to the brake means to be measured, said sensor being adapted to pass electrical current in inverse proportion to its temperature, a circuit unit including the sensor, means to impress a specific constant DC voltage on the circuit unit, circuit means to compare the current transmission characteristics of the sensor represented as a voltage to a preselected voltage reference, and reference display means to indicate the relation of the current transmission characteristics of the sensor to the preselected reference.

For a better understanding of the invention, reference should be had to the accompanying drawings wherein.

The system to be described more fully hereinafter is to warn the pilot of an aircraft that brake temperatures are at or above specific points. However, the temperature indication system may be used with any braking means for indicating temperature conditions therein. For each brake unit, preferably two warning lights are provided in addition to an optional metering system to show the specific temperature at any given time. Particularly, the invention contemplates that an amber light will be energized or come on when the brake temperature gets too high for a safe take off, and that a red light will next be energized or come on whenever the brake temperature gets dangerously high so that structural damage might occur .There will be a red and an amber light for each brake unit. In order to simplify the description of the invention, only a single brake temperature sensing unit has been described. However, it should be understood that similar circuits may be used for the other brakes associated with the other wheels on an aircraft or other vehicle.

Figure 1:
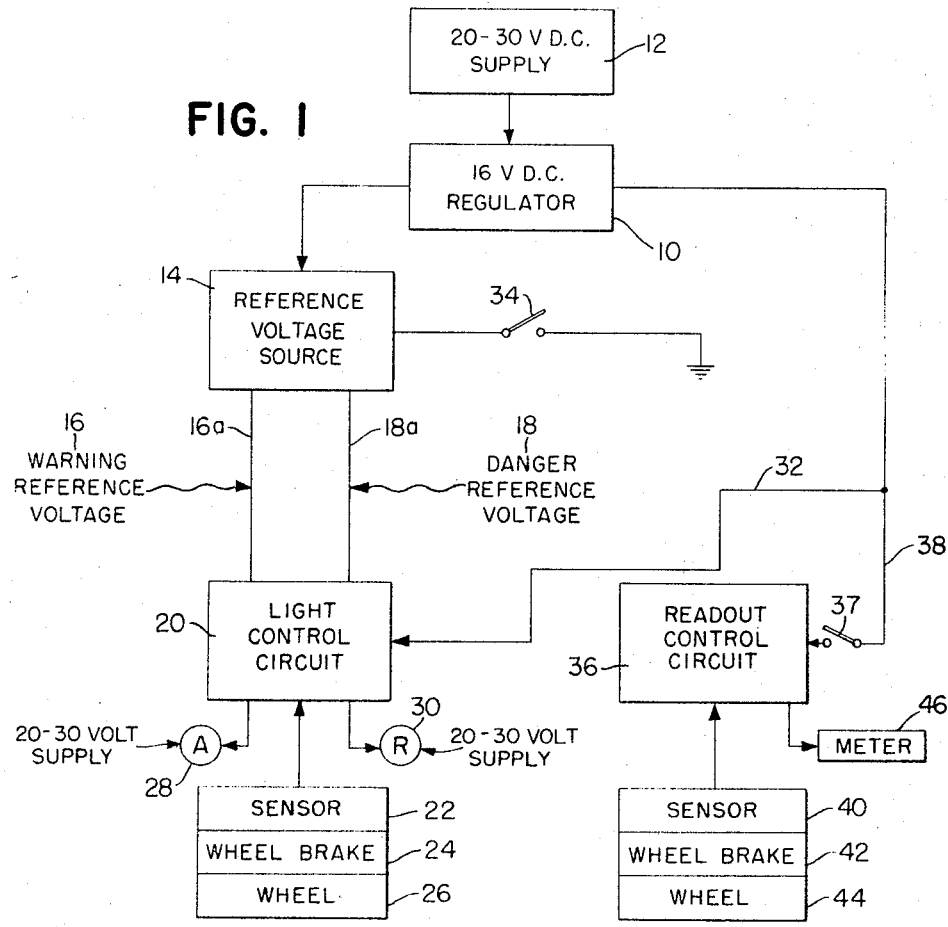
FIG. 1 is a block diagram schematic illustration of the components comprising the preferred embodiment of the invention.

FIG. 1 represents a block diagram of a particular system. Specifically, the system includes a sixteen volt DC regulator circuit which is utilized to provide a stable voltage so that the operation points for the lights will not change even if there is some change in the voltage supply to the regulator circuit for some outside reason. For example, the voltage supply may range between the 20 to 30 volts indicated in the drawing. The DC regulator is indicated by the numeral 10 while the 20–30 volt DC supply is indicated by the numeral 12.

The DC regulator 10 feeds 16 volts into a reference voltage source 14 which provides two stable reference voltages, one for the amber lights, and one for the red lights. Thus, in the diagram, the warning reference voltage is indicated by the numeral 16 while the danger reference voltage is indicated by the numeral 18. These voltages feed into a light control circuit 20 which then utilizes these voltages, as more fully explained hereinafter, in combination with the change in resistance of a temperature sensor 22. The sensor 22 is mounted in close proximity to a wheel brake 24 which wheel brake is associated, in this instance, with a rotative aircraft wheel 26.

The invention contemplates that the sensor 22 may be in the form of a probe and will include a resistance type sensor, which typically would be made of platinum wire, such as a platinum type sensing element made by The Rosemount Eng. Corp. of Minneapolis, Minn., or Nova-Netics, located in Los Angeles, Calif. Platinum is utilized because it will go to higher temperatures without deforming or becoming brittle, and it does have a linear proportionality to the passage of current directly in relation, or proportion to the temperature thereof. The specific configuration and location of the sensor will vary in accordance with the particular wheel to which it is applied. Also, the characteristics of the resistance itself will vary in accordance with location in proximity to the wheel brake 24. For example, the sensor 22 could be mounted externally of the wheel on the brake housing in close proximity to the usual hottest portion of the brake. Another possible location would be as one of the original brake tie bolts which is replaced by a special tie bolt having the sensor in a chamber provided in the bolt. Normally, the invention contemplates that any position of the sensor in an optimum position for sensing brake temperature will meet the objects of the invention, and the sensor is connected in the circuits as hereinafter described for current flow therethrough. Naturally, it is desirable to have the temperature sensed by the sensor reflect as accurately as possible the actual brake temperature of the brake unit. The sensor is of a commercial construction and will be connected in the control circuit in a conventional manner.

It should be noted that in the schematic block diagram that the sensor 22 feeds into the light control circuit 20, and this circuit 20 actually effects control of an amber light 28 and a red light 30. The light control circuit 20 receives a direct 16 volt DC current from the voltage regulator by a line 32. Either one or the other, or both, of the reference voltages 16 and 18 may be supplied to the light control circuit over associated lines 16a and 18a. A test switch 34 is provided and connected to ground through the reference voltage source 14 to effect a check of the entire circuit, as more fully defined hereinafter.

As a part of the invention, but embodying slightly different circuitry, the invention contemplates utilization of a readout control circuit 36 receiving a feed from the regulator 10 over a line 38. A sensor 40, similar to the sensor 22 associated with the light control circuit 20, is provided in associated with a wheel brake 42 and wheel 44 to indicate the temperature to the circuit 36 so that it may be readout by a meter 46. The sensor 40, wheel brake 42 and wheel 44 will normally be the same units as the sensor 22, brake 24 and the wheel 26. The meter 46 is calibrated to measure the voltage at Point A as described hereinafter in FIG. 2, and indicate it as a temperature. Switch 37 is provided to control readout action. It should be thus understood that the invention contemplates utilization of two separate warning systems. Specifically, the light control circuit 20 to provide visual indication of temperature by the amber light 28 and red light 30, and a visual meter read out system in the form of the control circuit 36 and meter 46.

LIGHT CONTROL CIRCUIT

Figure 2:
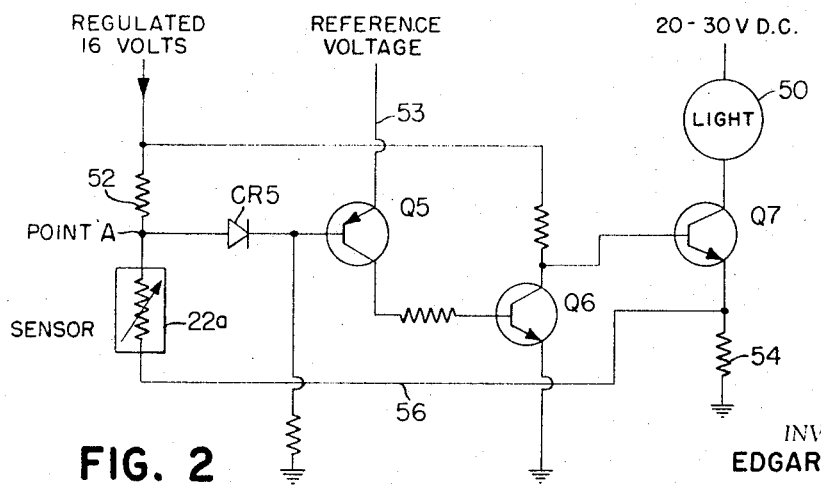
FIG. 2 is an electrical schematic diagram illustrating how one sensor functions to provide energization to a light indication system.

FIG. 2 illustrates a light control circuit for only a single light. Thus, it could not be substituted directly for the light control circuit 20 in FIG. 1. However, the principles of circuit control are clearly illustrated in FIG. 2. Particularly, it should be noted that the circuit receives an input of a regulated 16 volts, a specific reference voltage, somewhat less than 16 volts depending upon the particular temperature at which the circuit will actuate, and a 20–30 volt DC supply to a light 50. In operation, the 16 volt input is divided by a voltage divider consisting of a resistor 52, a sensor 22a, and a resistor 54. In a particular circuit wherein it was desired that the light could be turned on at approximately 500° F., the resistor 52 was approximately 1500 ohms plus or minus one ohm, the sensor 22a, approximately 500 ohms, at 32° F., and the resistor 54 approximately one ohm. A reference voltage is constantly applied by line 53 to the emitter of a transistor $Q_5$. This reference voltage is the same as the voltage that will exist at Point A between the resistor 52 and sensor 22a when the sensor temperature reaches the desired turn-on temperature for the light 50. When the sensor temperature is lower than the desired turn-on temperature, the voltage at Point A is lower than the reference voltage. This means that the transistor $Q_5$ is then conductive, and this also causes the transistor $Q_6$ to be conductive. While the transistor $Q_6$ is conductive, the transistor $Q_7$ is not conductive, and the light 50 is not turned on.

In order to eliminate any condition where the light 50 might be only partially turned on, the circuit is designed to provide fast action turn on and turn off of the light 50. This is accomplished by connecting a return line 56 from the temperature sensor 22a to the emitter of the transistor $Q_7$ so that the resistor 54 must carry the sensor current and the light current. Since the sensor current is quite low compared to the light current, the voltage initially developed over the resistor 54 by the sensor current is quite low. However, when the transistor $Q_5$ begins to become non-conductive, and the light current begins to flow, the light current causes an increase in the voltage across the resistor 54. This results in a further increase in the voltage at Point A which causes $Q_5$ to become less conductive and thus regeneratively causes the light current to quickly reach full value. The overall result is an instantaneous turn on of the light. When the temperature of the sensor 22a decreases, the light will turn off instantly by the reverse process, except that because the system in essence is regenerative, the temperature at which the light 50 will turn off will be several degrees lower than the temperature at which it turned on. This can be quite easily regulated by controlling the resistance of the resistor 54. The fact that the light 50 will not turn on until a considerable increase in temperature at the sensor 22a has occurred, also means that there will be no hunting or flickering of the light 50 at any time. A diode CR5 is positioned between Point A and the transistor $Q_5$ to compensate for the effects of ambient temperature on the transistor $Q_5$. The diode CR5 causes the turn on and turn off voltages for the light 28 to remain stable throughout the range of ambient temperatures of from about −65° F. to about 160° F. for the circuit. The sensor 22a normally would be at ambient temperature of the brake and hence would only set up a proper voltage drop thereover to reach the reference voltage supplied by the line 53 at, for example, a temperature of about 500° F.

Figure 3:
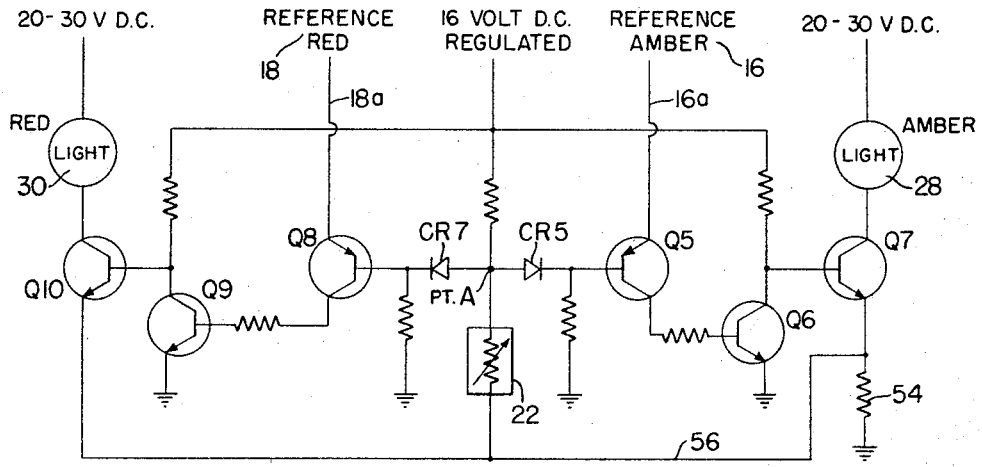
FIG. 3 is a schematic electrical illustration of how one sensor can feed two lights and provide a different turn on level for each of the lights.

In an optimum design for the light control circuit 20, the sensor 22 controls both lights 28 and 30 and a circuit for such control of FIG. 1 is shown in FIG. 3. It should be noted that FIG. 3 contains substantially half of the same components, as shown in FIG. 2. Thus, the description of FIG. 3 relates to transistors $Q_5$, $Q_6$ and $Q_7$ and light 28 is exactly the same as shown in FIG. 2, but the light 28 replaces the light 50. However, because the reference voltage 16 supplied to $Q_5$ is less than the reference voltage 18 supplied to a transistor $Q_8$, the light 28 comes on first and the resultant increase in voltage across the resistor 54 is not sufficient to cause any action in the circuit comprising transistors $Q_8$, $Q_9$ and $Q_{10}$ for the red light 30. However, if the temperature of the sensor 22 continues to increase, the voltage at Point A will also continue to increase. When the voltage at Point A reaches the same value as the reference voltage 18 for the red light 30, such light will come on by the same type of circuit action that caused the amber light 28 to come on, as previously described with reference to FIG. 2, i.e. $Q_8$ and $Q_9$ normally conductive and $Q_{10}$ normally non-conductive.

It should be noted that the current causing the red light to come on must also pass through the resistor 54, and thus causes snap action of the red light in the same manner as was described for the amber light. Also, of course, the temperature must drop well below the turn on point for the red light before it would shut off.

16 VOLT DC REGULATOR

Figure 4:
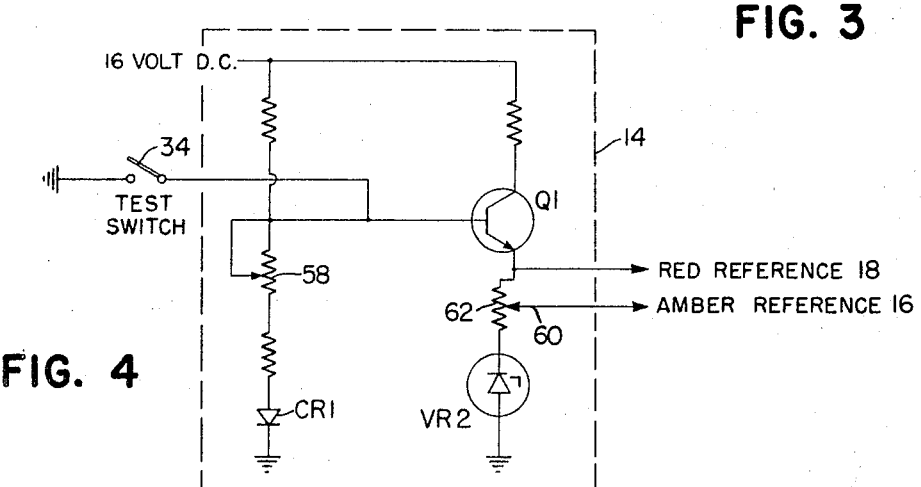
FIG. 4 is a schematic electrical illustration of how the reference voltages for the feeding of the specific electrical circuit of FIG. 3 are achieved.

The regulator supply of 16 volt DC is provided so that normal changes in the 20–30 volt DC supply voltage, FIG. 1, will not cause any shift in the operating point or reference voltages for the lights. The regulated voltage is also used in providing the amber and the red reference voltages. FIG. 4 shows the circuit for the reference voltage source 14. The red reference voltage 18 is taken from the emitter of the transistor $Q_1$, and this voltage level is controlled by the setting of a variable resistor 58. A solid state diode CR1 provides compensation for the effect of temperature change upon the base emitter characteristics of the transistor $Q_1$. The amber reference voltage 16 is taken from a movable contact 60 of a variable resistor 62. A suitable solid state voltage regulation stabilizer VR2 provides stabilization of the amber reference voltage during turn on and turn off of the amber light. This feature of the circuit is most adaptable when there are several brakes and therefore several amber lights, and it effectively minimizes any tendency for one amber light, which is near the threshold of switching, to be effected by the switching of another amber light. The reference voltages for the entire system, as used in practice of the invention, are contemplated to be supplied from the same circuit, whereby continuity and stability of operation is achieved.

VOLTAGE REGULATOR CIRCUIT

Figure 5:
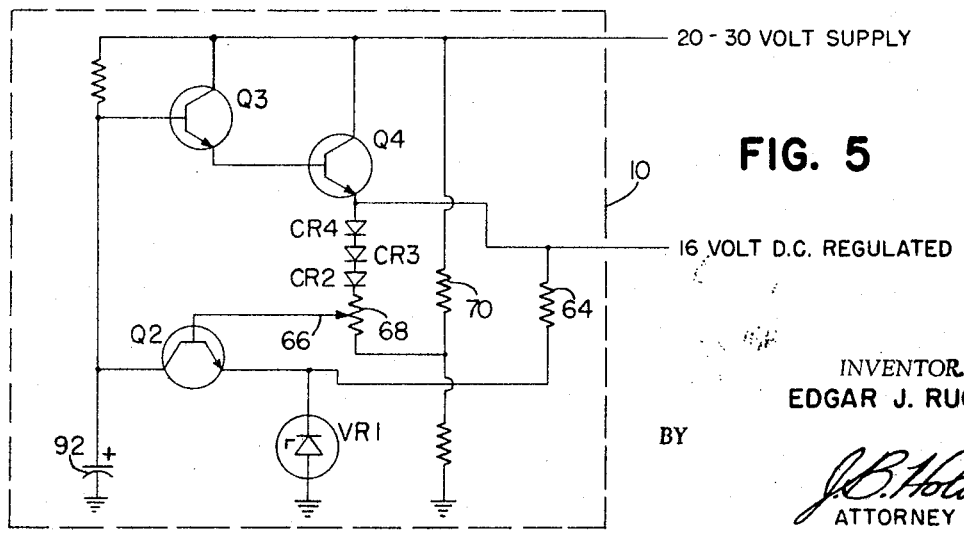
FIG. 5 is an electrical schematic illustration of how a constant reference voltage is achieved without regard to temperature, load, or other outside changes.

The circuit of the DC regulator 10 which provides 16 volts is stabilized against changes in load, supply voltage, and temperature. It is shown in FIG. 5. Specifically, the emitter of a transistor $Q_2$ is held at a stable level by a solid state voltage regulator VR1. A resistor 64 provides current to assure that a suitable regulator VR1 always operates above the knee of its normal curve of operation even though the emitter current of the transistor $Q_2$ may be small.

During operation, if the voltage on the emitter of a transistor $Q_4$ should tend to increase from any outside source, a resulting increase would appear at a movable contact 66 of a variable resistor 68. This would cause the transistor $Q_2$ to conduct more heavily and would lower the voltage at the base of a transistor $Q_3$. This, in turn, would cause a reduction in the voltage at the emitter of the transistor $Q_4$. The overall result, therefore, is a stable voltage at the emitter of the transistor $Q_4$, with the level of the voltage being dependent upon the setting of the contact 66 on the variable resistor 68. The solid state diodes CR2, CR3, and CR4 provide effective compensation against changes in the characteristics of the other semi-conductors or transistors which are caused by changing the ambient temperatures. A resistor 70 provides increased stability for the 16 volt output despite changes in the DC volt supply. A capacitor 92 is simply a noise filter.

The entire circuit is tested by grounding the base of the transistor $Q_1$ which is shown in FIG. 4. Such action removes the reference voltages from all light circuits, and causes all lights to come on simultaneously. Lights will not come on if any of the light-circuit components are defective, or if the voltage regulator circuit shown in FIG. 5 is defective. It should be noted, however, because of the circuit configuration that an open circuit in a sensor will cause both the amber and the red lights for that brake to be on regardless of brake temperature, and regardless of whether or not the test button 34 is pushed.

It will be realized that any suitable indication means may be substituted for the lights 28 and 30 described herein.

The resistance 52, the sensors 22a, or equivalent means in the circuits of the invention may be considered to be a circuit unit to which a fixed voltage is supplied.

Any suitable transistors or semi-conductors may be used in the circuits described herein and the diodes and other components of the circuit are conventional. The voltage regulator VR1 normally is a Zener diode.

In view of the above, it is believed that the objects of the invention have been achieved and that a novel and improved brake temperature sensing circuit and associated means have been provided by the invention. It is seen that the resistance of the temperature sensor used increases with the temperature increase.

While in accordance with the patent statutes, only one best known embodiment of the invention has been illustrated and described in detail, it is to be particularly understood that various modifications may be made to fall within the objects of the invention.

What is claimed is:

1. In a brake temperature indication system, the combination of
    a rotatable wheel,
    brake means for the wheel,
    a temperature sensor mounted in close proximity to the brake means to be measured, said sensor being adapted to pass electrical current indicating its temperature,
    a circuit unit including the temperature sensor,
    means to impress a specific constant DC voltage on the circuit unit,
    circuit means to compare the current transmission characteristics of the sensor represented as a voltage to a preselected voltage reference, and
    display means to indicate the relation of the current transmission characteristics of the sensor to the preselected reference.

2. A combination according to claim 1 where the display means are illumination means which are only energized by the circuit means when the current transmission characteristics of the sensor at least equals the preselected voltage reference.

3. A combination according to claim 1 where there are two pre-selected voltage references, one representing a warning temperature level and the other representing a danger temperature level, and where the display means are two lights, one of which is energized by the circuit means when the temperature of the sensor reaches the warning level, and the other light is energized when the temperature reaches the danger level.

4. A combination according to claim 3 where meter means are provided to directly readout the brake temperature indicated by the voltage resistance characteristics of the sensor.

5. A combination according to claim 1 where the means to impress the DC voltage on the sensor is stabilized against changes in load, supply voltage, and temperature.

6. A combination according to claim 2 where the circuit means are regenerative to insure a snap on at full voltage, and where such regeneration feature further allows the temperature sensed by the sensor to fall appreciably below the temperature at which the current transmission characteristics of the sensor equals the preselected voltage reference before the illumination means are deenergized.

7. In a brake temperature indication system for use with a rotatable wheel, and brake means operatively connected to the wheel, the combination of
    a temperature sensor mounted in close proximity to said brake means to sense the temperature thereof, said sensor being adapted to pass electrical current in inverse proportion to its temperature,
    a circuit unit including said sensor,
    means to impress a specific constant DC voltage on said circuit unit,
    circuit means connected to said sensor to compare the current transmission characteristics of said sensor represented as a voltage to a pre-selected constant voltage reference, and
    means to indicate the relation of the current transmission characteristics of said sensor to the preselected reference by being actuated when the voltage at said sensor at least equals the said voltage reference.

8. A combination according to claim 7 where the circuit means include a normally non-conductive transistor in series connection with a power source and said last-named means, and a normally conductive transistor means connected to said transistor and to said sensor to be rendered non-conductive when the current transmission characteristics of said sensor at least equals the preselected voltage reference at which time said transistor is made conductive.

9. A combination according to claim 8 where there are two preselected voltage references, one representing a warning temperature level and the other representing a danger temperature level, and where the last-named means are two separate members, one of which is energized by the circuit means when the temperature of the sensor reaches the warning level, and the other means is energized when the temperature reaches the danger level, and where individual circuit means connect to each of said members.

References Cited
UNITED STATES PATENTS 3,347,098   10/1967   Bielstein et al. _____ 73—342

ALVIN H. WARING, *Primary Examiner.*

U.S. Cl. X.R.

73—342, 362; 340—52, 227, 248